United States Patent
Witt et al.

[11] Patent Number: 5,985,397
[45] Date of Patent: *Nov. 16, 1999

[54] COATED SYNTHETIC RESIN BOARD TILES

[76] Inventors: Alvin E. Witt, 413 Cranberry Dr., West Chester, Pa. 19382; Matthew F. Humphreys, 7600 Michaels La. #2, Knoxville, Tenn. 37920; Joseph E. Tomasko, RR2 Box 170, Allport, Pa. 16821

[*] Notice: This patent is subject to a terminal disclaimer.

[21] Appl. No.: 08/970,370

[22] Filed: Nov. 14, 1997

Related U.S. Application Data

[63] Continuation-in-part of application No. 08/749,939, Nov. 14, 1996, which is a continuation-in-part of application No. 08/406,835, Mar. 29, 1995, abandoned.

[51] Int. Cl.$^6$ ....................................................... B32B 3/10
[52] U.S. Cl. .................... 428/44; 428/48; 428/49; 428/87; 428/172; 428/192; 428/304.4; 428/339; 428/423.1; 156/60; 156/61; 156/64; 156/72; 156/244.17
[58] Field of Search .................... 428/172, 908.8, 428/44, 48, 49, 192, 423.1, 330, 304.4, 87; 156/61, 60, 64, 72, 73.4, 244.17

[56] References Cited

U.S. PATENT DOCUMENTS

| | | | |
|---|---|---|---|
| 3,287,203 | 11/1966 | Elmendorf | 428/215 |
| 3,579,410 | 5/1971 | Barrett | 428/50 |
| 4,756,951 | 7/1988 | Wang et al. | 428/204 |

*Primary Examiner*—Deborah Jones
*Assistant Examiner*—Abraham Bahta
*Attorney, Agent, or Firm*—Eugene E. Renz, Jr.

[57] ABSTRACT

A coated synthetic resin tile comprising a base portion and a veneer said base comprising a moisture impervious material such as a thermoset or thermoplastic resin. A filler of up to about 10% calcium carbonate having a 2 (two) sigma particle size between about 5.11 and 6.18 microns and an aluminum trihydrate flame retardant of about 60%–70% having a two (2) sigma particle size of between about 42.38 and 58.72 microns and an aluminum trihydrate of about 20%–40% having a two (2) sigma particle size of between about 8.26 and 9.68 microns to provide a class A flame spread rating. The veneer comprising a layer selected from the group consisting of an acrylic impregnated wood veneer and a hardwood veneer having a vinyl upper layer bonded to said base portion with a polyurethane adhesive.

6 Claims, 2 Drawing Sheets

COATED SYNTHETIC RESIN BOARD TILES

RELATED APPLICATIONS

This application is a continuation-in-part of Ser. No. 08/749,939 filed Nov. 14, 1996 which is a continuation-in-part of Ser. No.08/406,835 filed Mar. 29, 1995, abandoned.

FIELD OF THE INVENTION

The present invention relates to an improved floor tile and more particularly to a floor tile utilizing a synthetic resin in combination with an upper veneer layer so as to provide an environmentally superior floor tile.

BACKGROUND OF THE INVENTION

The demand by consumers for floor tiles which are pleasing and which embody improved safety and reduced use of natural resources has forced planners, designers, manufacturers and vendors to respond to these needs. It is particularly important in the construction industry to make more efficient use of wood and wood products, at least in part because mature trees are being harvested faster than they are being produced. It is also important that material which is substituted for some or all of the wood in the floor tile be safe and not contain harmful chemical products which have potential for long term adverse effects on humans. A simple manufacturing process is necessary in order to make the product at a reasonable cost while yet providing a safe and appealing floor tile.

KEMMLER, et al., U.S. Pat. No. 2,430,934, discloses a floor covering having a top layer of polyvinyl chloride over a felt or burlap backing. These are obviously not acceptable floor tiles. BARRETT, U.S. Pat. No. 3,579,410 discloses a parquet flooring in which wood blocks are formed into a wood-plastic composite. In BARRETT, an acrylic impregnated wear layer is placed on two layers of raw wood. This is then bonded to a subfloor.

WANG, et al., U.S. Pat. No. 4,756,951 discloses a surface covering which may be used for floors, walls, desks, countertops and the like, in which a platy material is included in one or more of the layers of the surface covering. The covering includes a substrate which may be of paper, metal, wood, foil, fabric or a foamable resinous layer such as vinyl chloride. On top of the substrate is a design and an overlying transparent or translucent layer which contains the platy material. A transparent wear layer overlies the entire surface covering to protect and preserve it.

MEISSNER, U.S. Pat. No. 3,231,457 includes a wood veneer flooring in which a backing made from waste rubber and the like is covered with a lining, a wood veneer and a plastic overlay. Similarly, ELMENDORF, U.S. Pat. No. 3,287,203 describes a plywood subfloor onto which is placed a tile having a wood fiber hard board base, a natural wood layer and a vinyl resin coating. Both of these patents used substantial quantities of natural wood since the wood forms a part of the structural integrity of the flooring.

None of the known floor tile methods provide a truly modern floor tile in which natural wood beauty is preserved, using ecologically responsible quantities of wood while at the same time having other important features, particularly relating to safety and environmental concerns. None of the known floor tile withstand sub-floor moisture. Sub-floor moisture is becoming an increasing problem today as construction is performed more rapidly but less carefully. In a commonly owned co-pending application, one solution to the problems of the prior art has been proposed in which a cement base is cut to a certain size and a veneer formed from both wood and vinyl is applied to the surface or top of the cement to provide a floor tile. This application, entitled COATED CEMENT BOARD TILES, has now issued as U.S. Pat. No. 5,437,934. The invention described therein provides a substantially improved tile which is capable of providing superior flame spread resistance and other advantages while eliminating expensive subfloor and installation requirements. However, in instances where the floor tile is to be shaped, the difficulty in the shaping a cement base after the cement has set is significant and reduces the versatility of the tile.

Accordingly, it is an object of this invention to provide an improved floor tile which has simplified installation requirements relative to subfloor preparation, and which has environmental and safety advantages.

Another object of this invention is to provide a floor tile which is easily finished using conventional or standard wood working equipment to provide, for example, tongue and groove plank flooring of various configurations.

Yet another object of the present invention is to provide a safe, moisture resistant, synthetic floor tile with maximum flame and fire resistance.

Other objects will appear hereinafter.

SUMMARY OF INVENTION

It has now been discovered that the above and other objects of the present invention may be accomplished in the following manner. Specifically, the present invention provides for a floor tile comprising two parts.

The bottom or base portion of the tile is a cured resin such as polyester that also includes a flame retardant filler, glass fibers, anti-oxidants and other components. It is formed by mixing the resin with the flame retardant and other fillers to form an admixture. A catalyst is added as the admixture is formed on a continuous path. The resin is cured on the path to form a tile base which is then cut and gauged to a desired size. There is no need to seal this substrate against moisture.

On top of the base portion is a veneer layer having a combination of wood and synthetic resins. In one embodiment, the veneer comprises an acrylic impregnated wood veneer which has been cured, covered with an adhesive and a fabric of glass fibers, and pressed onto the tile base to form the final product. In the other primary embodiment, a hardwood veneer is first coated with an upper layer of vinyl and then bonded to the base with an adhesive encasing a fabric of glass fibers and pressed to form the final product. In both cases, the veneer mated tile is sized to a desired tile size.

The veneer layer provides the attractive appearance of wood while utilizing a substantially smaller amount of wood than has previously been accomplished. In one embodiment, the veneer layer comprises an acrylic impregnated porous wood such as red oak, ash, maple, cherry and the like. Red oak is a preferred porous wood that absorbs large quantities of monomers to produce a saturated, impregnated veneer of admirable appearance and wear. In the other embodiment, the veneer layer may be formed from a wood veneer having a vinyl laminate thereon in an amount sufficient to form a protective outer surface.

An improvement is realized when the acrylic impregnated embodiment as described above is sealed across its top face with a polyurethane or other material that prevents moisture absorption. This tends to make the board more resistant to fluctuations in humidity at the installation site, as well as differences in humidity between the installation site and the fabrication site. This same improvement is realized in the vinyl laminate embodiment when the sides are similarly sealed to prevent moisture absorption.

The impervious base is formed from a resin which has dimensional stability and can absorb stress and compressive forces normally experienced in the flooring. Preferred are polyester and polyurethane resins, although it is also contemplated that any thermoset or thermoplastic resin may be used as the synthetic resin for the base. Most preferred are composite unsaturated polyester resins such as are manufactured and sold by Cook Composites, Inc. under the trade designation 40-5717, 40-5821, 40-5820, 40-2783, and the like.

The resin forming the base also includes a flame retardant filler such as alumina trihydrate, glass fibers to impart strength, air release additives, inhibitors and dispersing agents as needed to provide a smooth liquid blend of monomer. The mix is pumped through a metering device to disperse the monomer on a continuous steel belt. A catalyst or promoter is added through the metering device to begin the curing process. After the mix is metered onto the belt, it is passed through a series of ovens which complete the cure of the polymer. At this point, the base is cut to a desired size and is gauged for final thickness.

An optional filler in this board is crushed stone or marble. This material serves the function of replacing more costly resin but has the disadvantage of requiring special tools for fabrication; therefore, this option is not considered part of the preferred embodiment. It is also possible to use beads of glass or other inert material as filler. Another cost reduction option to consider in the fabrication of the board is foaming, or building up the volume of the resin with bubbles of air or a gas. This can be accomplished using chemical foaming agents which tend to be toxic andlor flammable or direct introduction of a gas. An inert gas has the advantage of not adding oxygen to the board, a consideration when safety is concerned.

In accordance with another embodiment of the present invention, the tile comprises of base and a wood veneer bonded to the base by an adhesive.

In accordance with this embodiment of the present invention, the base is moisture impervious and fire retardant and is formed from about 20%–30% by weight of total resin weight of a flexible resin selected from the group of flexible, unsaturated polyester resins, a rigid resin of about 60%–80% by weight of total resin weight selected from the group of rigid, unsaturated polyester resins, a filler of up to about 10% by weight of total filler plus flame retardant weight and a flame retardant of about 90%–100% by weight of total filler plus flame retardant weight. The flexible and rigid resins are cross-linked. The flame retardant has surface treatment to provide a tightly packed, hydrophobic base. In the preferred embodiment of the present invention, the filler is up to about 10% by weight calcium carbonate having a mean particulate size of about 5.64 and a 2 (two) sigma variation on a normal distribution of between about 5.11–6.18 microns. Note that 2 sigma means 90% of the particles fall in this range. The flame retardant is an aluminum trihydrate wherein about 60%–70% of the total aluminum trihydrate has a mean size of about 50 microns and a 2 (two) sigma of between about 42.38–58.72 microns and about 20%–40% of the total aluminum trihydrate has a mean size of about 8.97 microns and a 2 (two) sigma of between about 8.26–9.68 microns. It has been found that controlling the particulate size in the range described in the preferred embodiment provides optimum packing density which produces maximum strength and better flame retardancy. In this regard, products tested by the United States Testing Company have awarded an "A" rating for the coated synthetic resin tiles made in accordance of the present invention.

It has been found that the combination of cross-linked rigid and flexible resins in the preferred range set forth above prevents distortion of the veneer such as "cupping" due in part to the hydrophobic characteristics. Moreover, it has been found that this combination provides a base with the desired rigidity to withstand potentially damaging impacts.

The fabric of glass fibers provides stability to the product. This material aids in the dimensional consistency of the product throughout its lifetime in an uncertain installation environment, specifically fluctuations in temperature and humidity. Fabric of glass fibers has high tensile strength, dimensional stability, high heat resistance, chemical resistance, durability over time, and is economical. The advantage of this material may be compounded by stressing the fabric prior to and during the lamination step. This adds more complexity and cost to the production methods, however.

The preferred material for this application is a woven fabric of glass fibers, having a strand count of 6 to 60 ends per inch and a thickness of 2 to 15 mils (thousandths of an inch). Such a material has a breaking strength in excess of 80 pounds per inch. The weave can either be plain or, for greater stability, a twill. Alternatively, the fabric can be a non-woven fabric. By selecting a fabric with an appropriate open area, generally greater than 25%, the laminating glue will penetrate in sufficient quantity to bond both laminate layers with one application.

In an alternative embodiment, the fabric is also applied on the bottom of the resin board assembly and attached with a similar polyurethane adhesive.

Whether the hardwood veneer having a vinyl layer or the acrylic impregnated wood veneer is used, the next step comprises mating the two using a moisture activated polyurethane adhesive resin in a press. Within the adhesive layer is encapsulated a fabric of glass fibers. From this point standard woodworking equipment is used to complete the manufacture of the product, such as into tongue-in-groove plank flooring of various configurations.

BRIEF DESCRIPTION OF THE DRAWINGS

For a more complete understanding of the invention, reference is hereby made to the drawings, in which.

DETAILED DESCRIPTION OF THE PREFERRED EMBODIMENT

Figure 1:
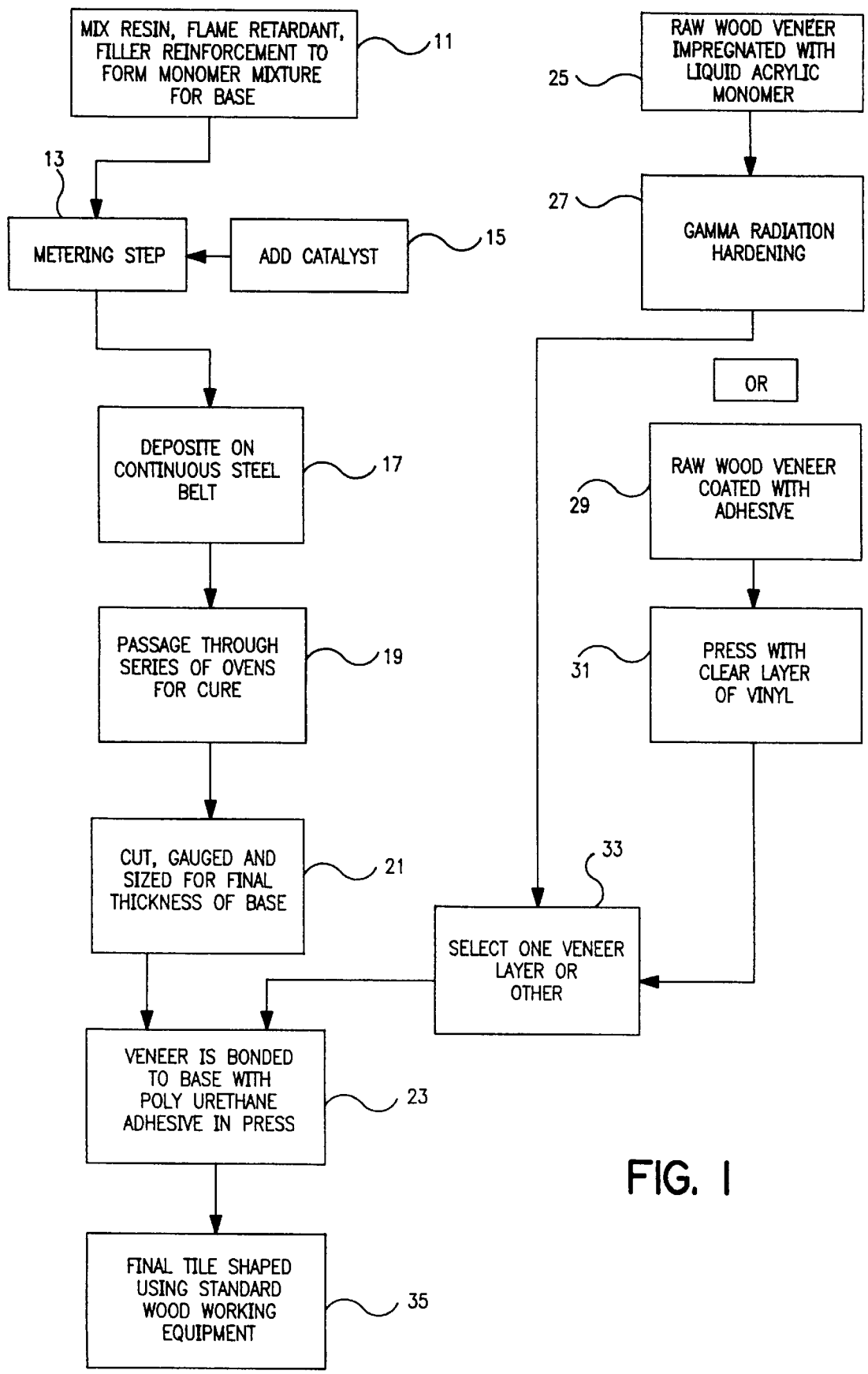
FIG. 1 is a flow diagram illustrating the process of the present invention, showing both preferred alternative embodiments.

As shown in FIG. 1, the present invention comprises a method of making coated synthetic resin tiles having a wood veneer surface. In FIG. 1, a resin, flame retardant fillers, waste fillers, strengthening glass fibers, air release additives, inhibitors and a dispersing agent are all admixed together to form a homogeneous admixture 11. The preferred polyester resin is a composite unsaturated polyester resin such as Cook Composites, Inc. composite resin 40-5717 and/or 40-5820 and/or 40-5821. In the preferred embodiment of the invention, the preferred polyester resin of the base portion is formed from about 20%–30% by weight of a flexible resin selected from the group of flexible, unsaturated polyester resins such as Cook Composites resins 40-5820 and/or 40-5821 and a rigid resin selected from the group of rigid, unsaturated polyester resins such as the Cook Composites resin 40-5717. These resins are cross linked. These resins are cured by a methyl ethyl ketone peroxide catalyst such as that supplied by the resin manufacturer. Any thermoset or thermoplastic resin may be used as the synthetic resin as long as it cures to a solid that can be worked as described below. Care should be taken to avoid resins that are flammable or that contain halogens and other materials that are potentially harmful when ignited.

The preferred flame retardant filler is alumina trihydrate, and is available, for example, from the Solem Division of J. M. Huber Company. Other fillers that are flame retardant to some degree, at least, are: sulfates, carbonates, clays such as kaolin, silica and silicates, and the like. Waste fillers such as dried waste sludge may also be included.

Fiberglass strengthening fibers may be added to improve structural integrity in the final product. Other reinforcing agents include wollastonite, mica, ceramic fibers, polymeric fibers such as aramid fibers, and the like. The preferred base is formed from about 20% to 30% by weight resin, about 5% to 10% glass fiber, 50% to 75% flame retardant such as aluminum trihydrate, and the necessary quantity of dispersing agents and catalysts. Other materials normally used in the preparation of solid resin materials such as air release additives, inhibitors, dispersing agents and the like are employed in a conventional manner.

The mix is then pumped through metering device 13 while simultaneously adding catalyst from a catalyst source 15 so that the catalyzed mixture is deposited on a continuous steel belt 17. Once metered onto the belt, the material is passed through a series of ovens 19 which complete the cure. At this point, the material is ready to be cut into manageable size and gauged for final thickness. A preferred thickness is 0.125–0.225 inches for the resin board. At this point, the board is ready to be mated with the top layer.

As noted above, the veneer added to the resin base may take one of several preferred embodiments. One embodiment, raw wood veneer is impregnated with liquid acrylic monomer in mixing section 25, followed by gamma radiation hardening of the acrylic monomer in chamber 27 to produce a veneer impregnated top layer. A typical acrylic impregnated veneer will be about 0.037 to 0.042 inches thick. Alternatively, raw wood veneer is coated with an adhesive in chamber 29 and pressed with a clear layer of vinyl at step 31 to produce the alternative embodiment top layer. In this embodiment, the genuine veneer layer will be about 0.024 inches thick, covered with a vinyl top wear layer of about 0.020 inches.

One of these veneer layers is selected at 33 where the base is coated with a polyurethane adhesive and a fabric of glass fibers placed in the adhesive. The veneer selected is then bonded to the base a press 23 where the fabric becomes encapsulated. This produces a final tile which can be worked with standard wood working equipment at station 35 to complete the manufacture of the product, for example, into tongue-in-groove plank flooring of various configurations. Installation is conventional.

Figure 2:
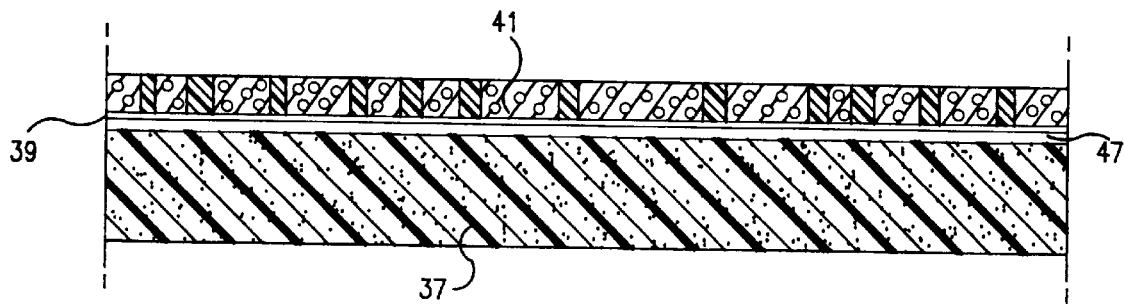
FIG. 2 is a cross-sectional view of one preferred embodiment of the present invention.

As shown in FIG. 2, the first embodiment produces a polyester resin base 37 having a fabric 47 encapsulated in a moisture activated polyurethane adhesive 39, and a veneer 41 impregnated with acrylic resin.

The resin base 37 and the elements comprising the laminated structure are preferably cold-pressed, which provides an effective bond between the laminates, particularly where they have different coefficients of expansion.

Figure 3:
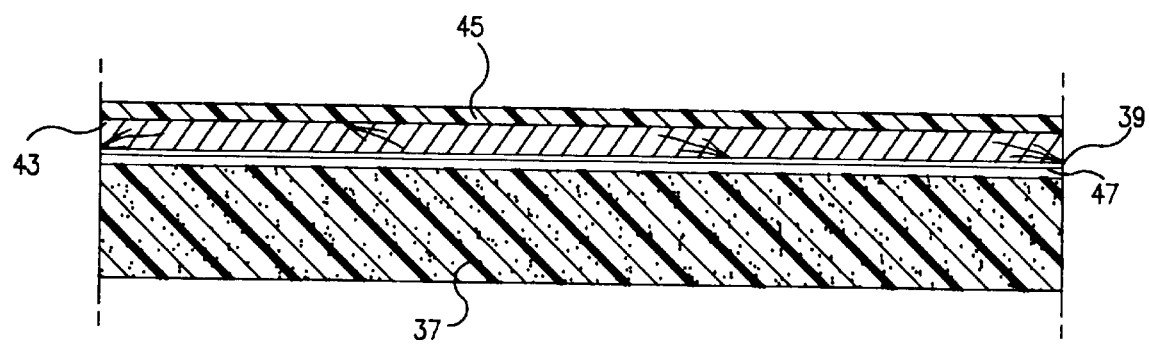
FIG. 3 is a cross-sectional view of another preferred embodiment of the present invention.

In FIG. 3, the other preferred embodiment is shown where the polyester resin cured base 37 and moisture activated polyurethane adhesive 39 with encapsulated fabric 47, are bonded with a wood veneer 43 having an adhesive bonded clear vinyl top 45.

Both final products provide enhanced aesthetics for the flooring and are easy to maintain over a very long period of time.

The floor tiles of the present invention provide a number of important advantages. In the acrylic impregnated veneer, the number of trees used per square foot of finished floor is reduced to 83% less than existing acrylic flooring. Also the acrylic veneer version, a much improved bond is achieved between the veneer and the substrate.

In the vinyl clad floor, where the wood veneer is covered with a clear vinyl, there is a substantial elimination of "telegraphing to the surface" from improper or inadequately prepared subfloors. This significantly reduces installation costs since minor irregularities in the subfloors will not need preparation to prevent them from being "telegraphed" to the surface of the tile.

In both cases, the two embodiments produce a superior flame spread rating which has never before been obtained in a wood floor. Specifically, tests have shown that both embodiments of the present invention are rated as Class A, less than 25, in the ASTM E84 tunnel test. Combined with very low smoke ratings, this is a significant advance in the art providing a substantial and unexpected improvement in safety considerations.

In addition, both methods produce a savings in manufacturing costs and have enhanced dimensional stability and a capability of withstanding environmental changes over wider ranges of temperatures without unsightly separation or compression of the tiles. Finally, both versions employ existing waste materials in the base resin tile, thereby helping to recycle and reuse previously unusable materials.

In addition to the above described preferred embodiments, several alternatives may be provided. Polyurethane resins or other thermoset or thermoplastic resins may be used in place of the polyester resins. Other flame retardants such as alumina trihydrate and halogenated resins may be employed. Selection of fillers can be made to give desired properties of workability, cost, waste utilization and the like. The final covering of wood may be of different thicknesses, tints or vinyl constituents. The thickness and widths of the material may vary depending upon the intended use of the tile it is expected that the tiles will be formed or modified to have a tongue-in-groove configuration in some instances. A square edge or other edge treatment is also possible. For aesthetic reasons either a square or beveled corner on the top surface may be desirable.

While particular embodiments of the present invention have been illustrated and described, they are not intended to limit the invention except as defined by the following claims.

What is claimed is:

1. A coated synthetic resin tile, comprising:
   a moisture impervious and fire resistant base portion comprising a thermoset or thermoplastic resin; and
   a veneer upper layer bonded to said base portion with a polyurethane adhesive, said upper veneer layer being selected from the group consisting of an acrylic impregnated wood veneer or a hardwood veneer having a protective coating.

2. A coated synthetic resin tile, comprising:

a moisture impervious base portion formed from about 20%–30% by weight of total resin weight of a flexible resin selected from the group of flexible unsaturated polyester resin and a rigid resin selected from the group of rigid unsaturated polyester resin, said resins being cross linked and a aluminum trihydrate flame retardant of about 50%–75% by weight; the flame retardant having a surface treatment to provide a tightly packed hydrophobic base; and a veneer upper layer bonded to said base portion with an adhesive, said upper veneer layer being selected from the group consisting of an acrylic impregnated wood veneer or a hardwood veneer having a vinyl protective coating.

3. A coated synthetic resin tile, comprising a base portion and a veneer:

said base comprising a moisture impervious material;

a calcium carbonate filler of up to about 10% by weight of the total filler and flame retardant and having a 2 (two) sigma particle size between about 5.11 and 6.18 microns and an aluminum trihydrate flame retardant of about 60%–70% by weight of the total filler and flame retardant and having a two (2) sigma particle size of between about 42.38 and 58.72 microns and an aluminum trihydrate of about 20%–40% by weight of the total filler and flame retardant and having a two (2) sigma particle size of between about 8.26 and 9.68 microns to provide a class A flame spread rating; and said veneer comprising a layer selected from the group consisting of an acrylic impregnated wood veneer and a hardwood veneer having a vinyl upper layer bonded to said base portion with a polyurethane adhesive.

4. A coated synthetic resin tile, comprising a base portion and a veneer:

said base comprising a moisture impervious material;

a calcium carbonate filler of up to about 10% by weight of the total filler and flame retardant and of about 4 micron particulate size and an aluminum trihydrate flame retardant of about 60%–70% by weight of the total filler and flame retardant and of about 50 micron particulate size and an aluminum trihydrate of about 20%–40% by weight of the total filler and flame retardant and of about 9 micron particulate size aluminum trihydrate to provide a class A flame spread rating; and said veneer comprising a layer selected from the group consisting of an acrylic impregnated wood veneer and a hardwood veneer having a vinyl upper layer bonded to said base portion with a polyurethane adhesive.

5. The tile of claim 4 further comprising a fabric of glass fibers underlying said base layer on the side opposite said upper veneer layer, impregnated with and bonded to said base portion by a polyurethane adhesive.

6. The tile of claim 4 wherein the said resin is selected from polyester resins and polyurethane resins.

* * * * *